United States Patent Office 2,707,866
Patented May 10, 1955

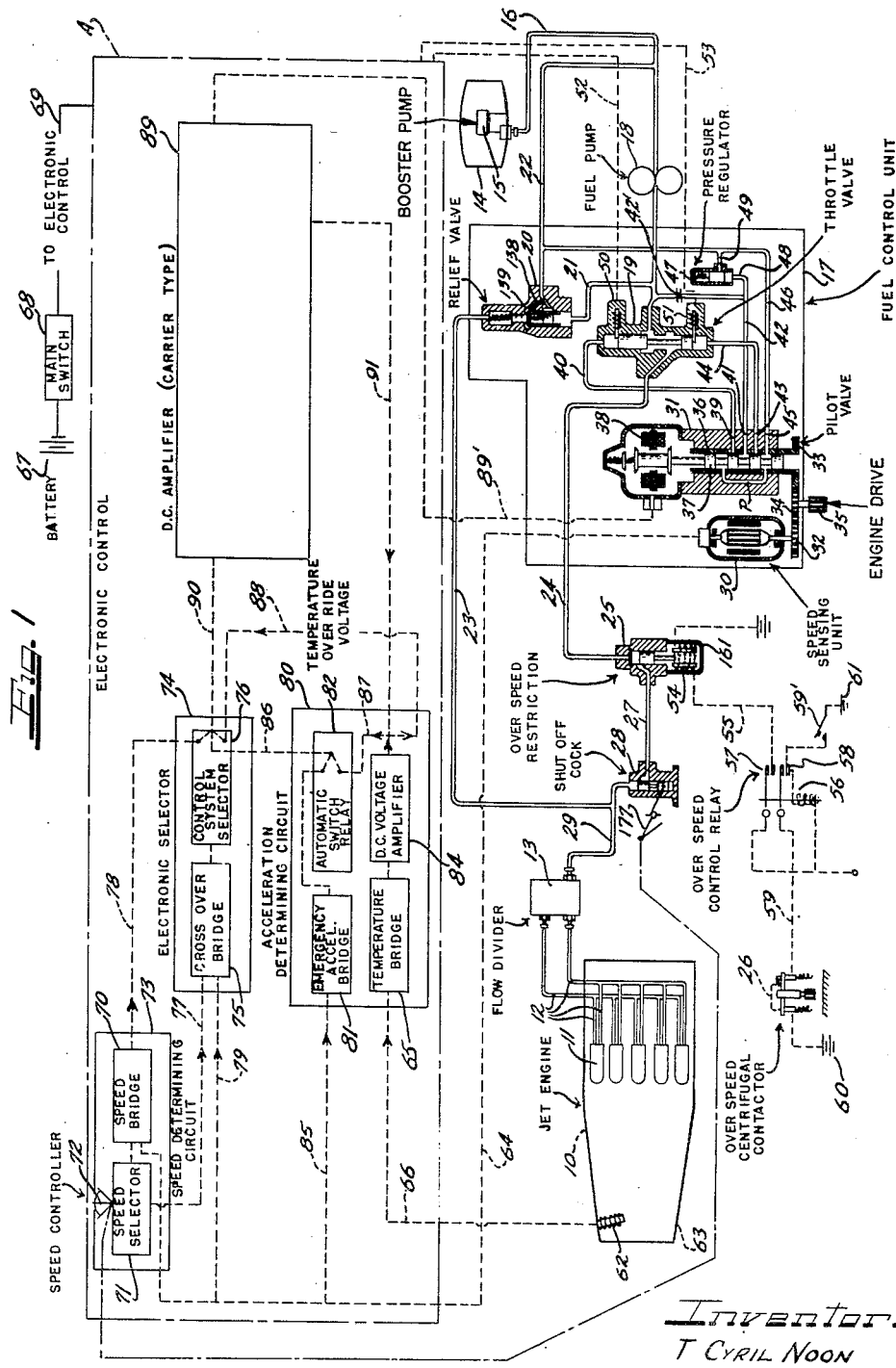

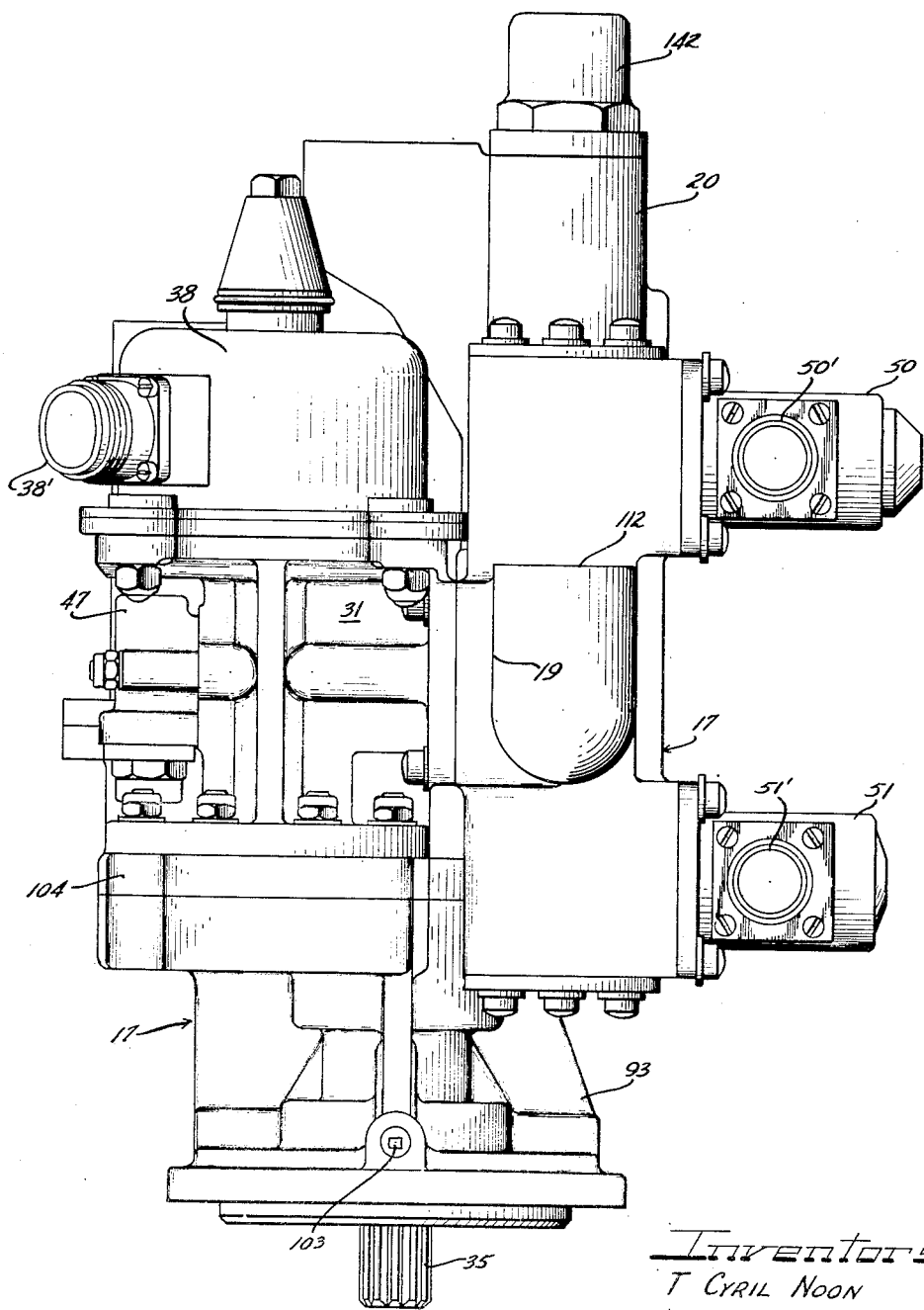

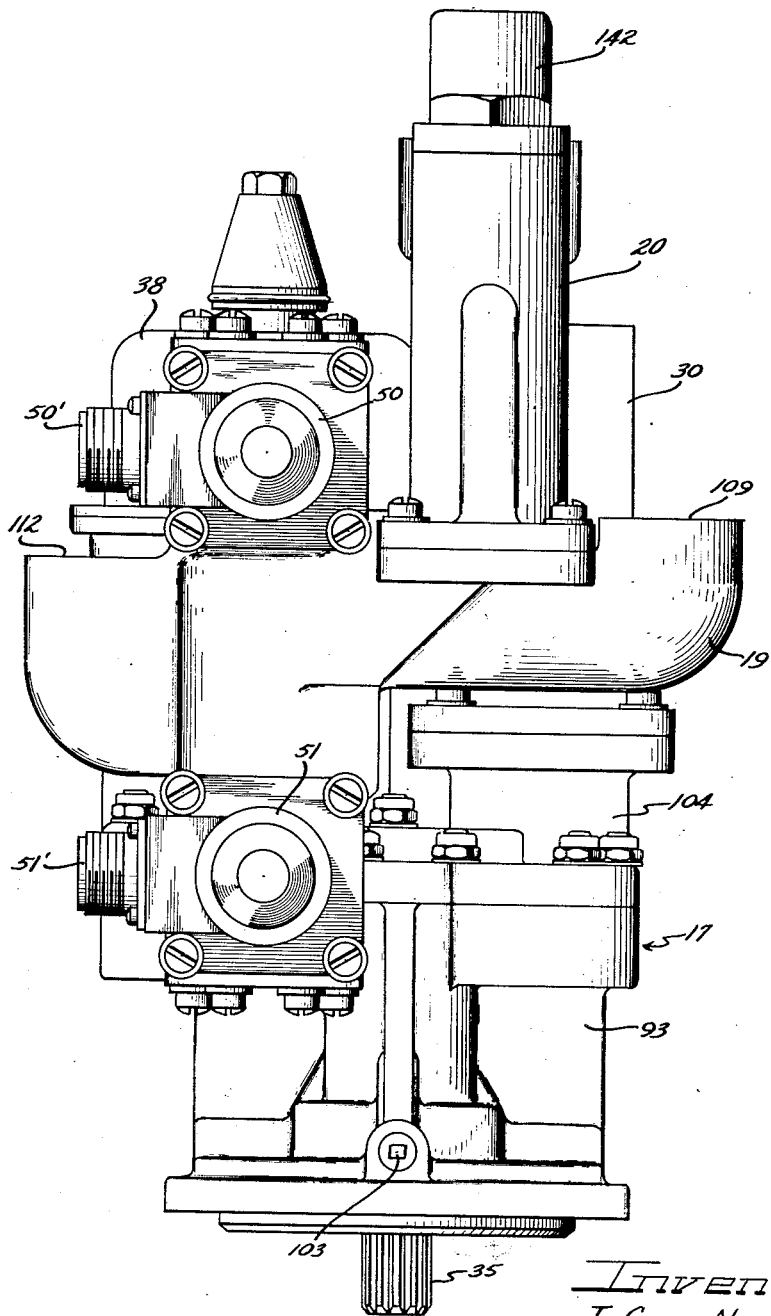

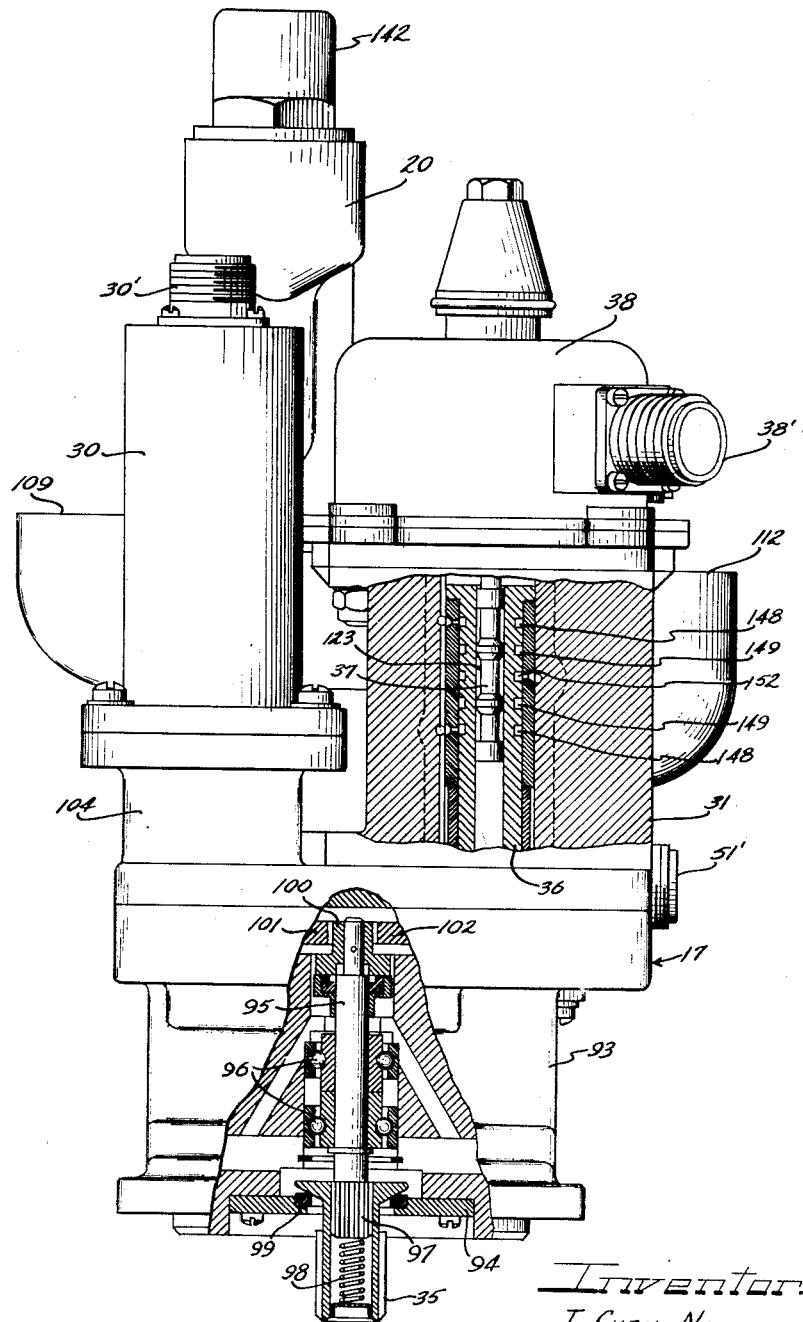

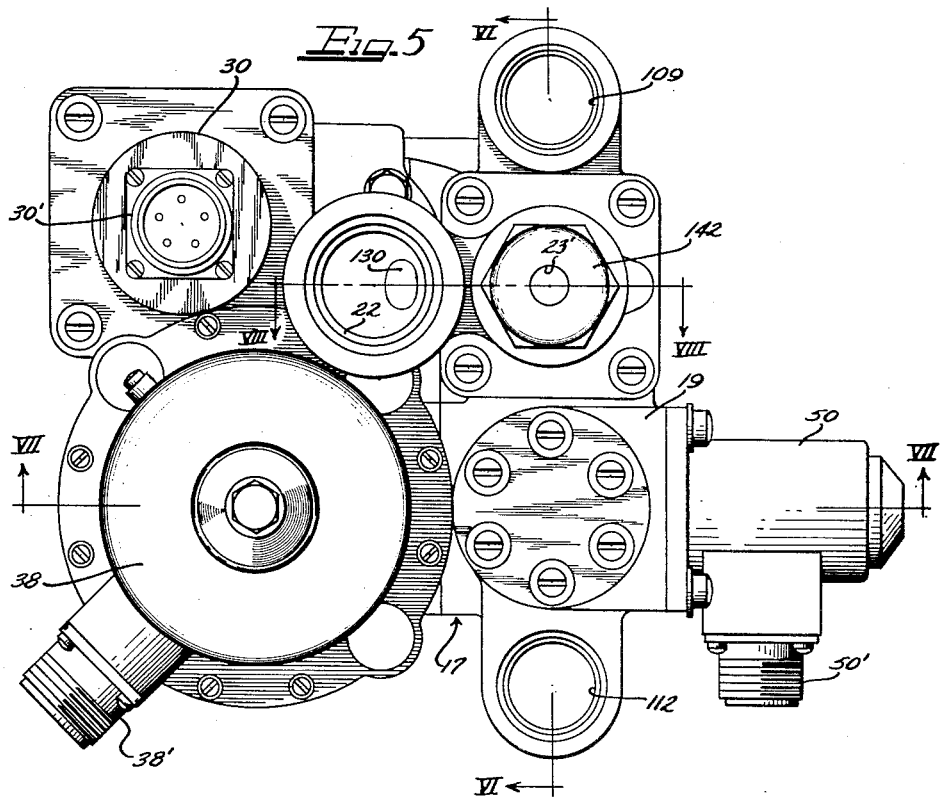

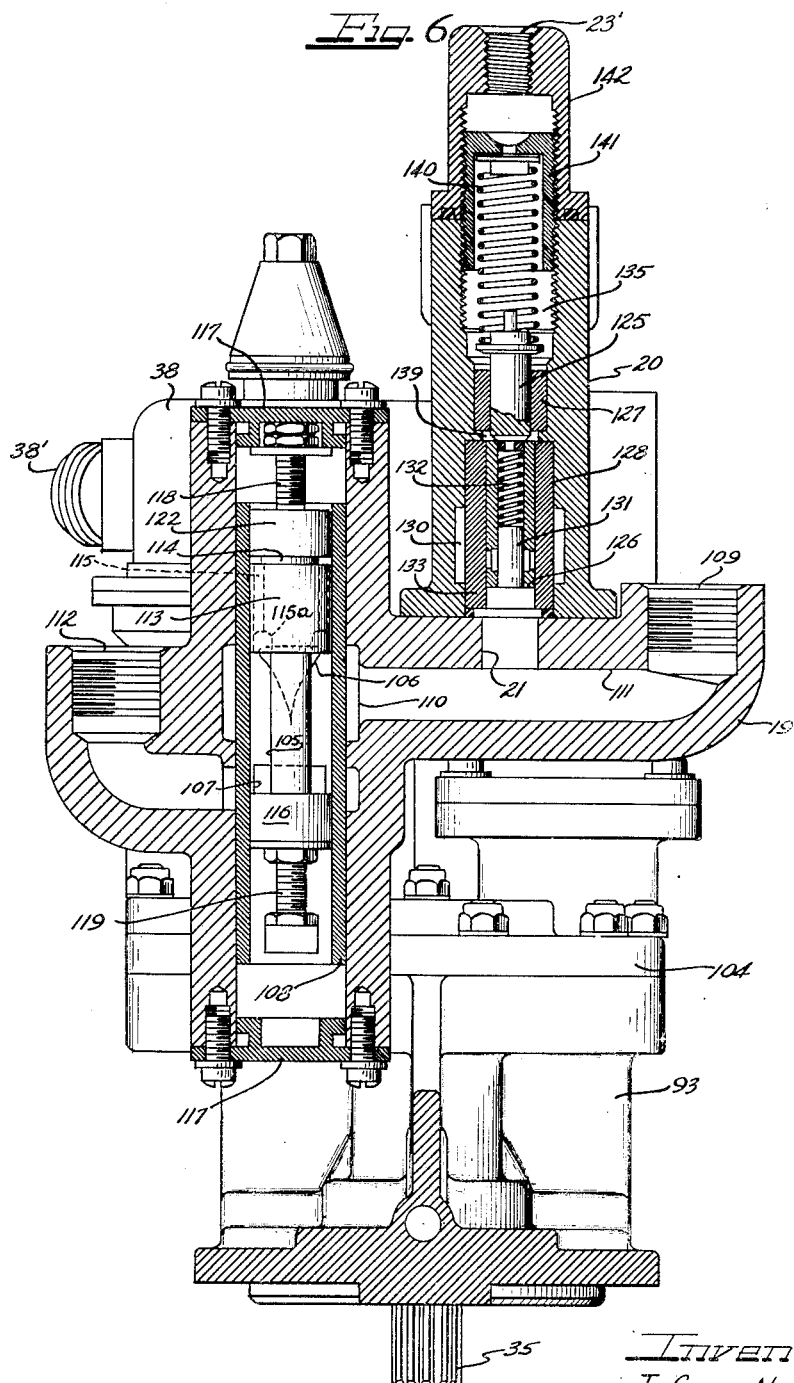

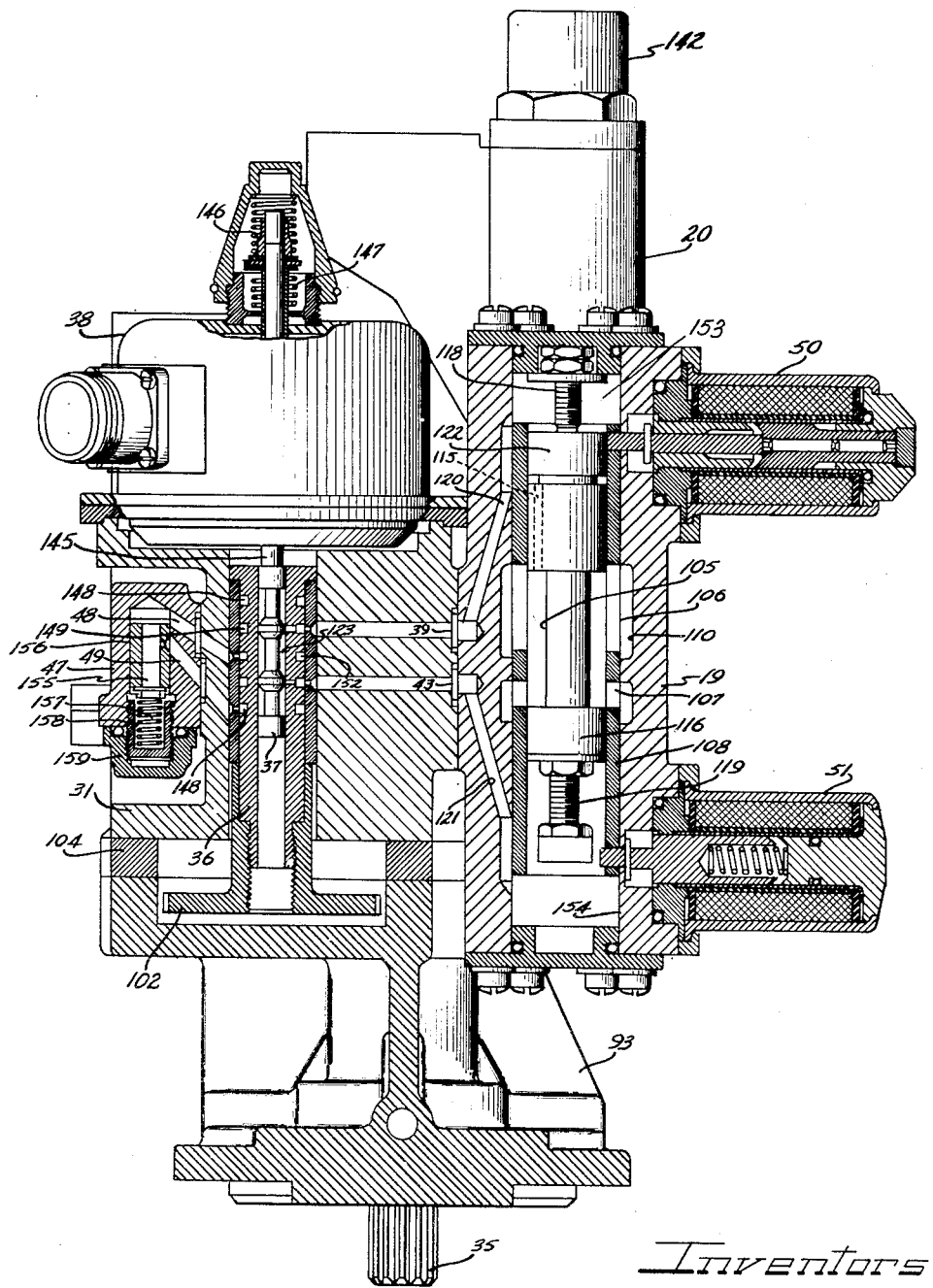

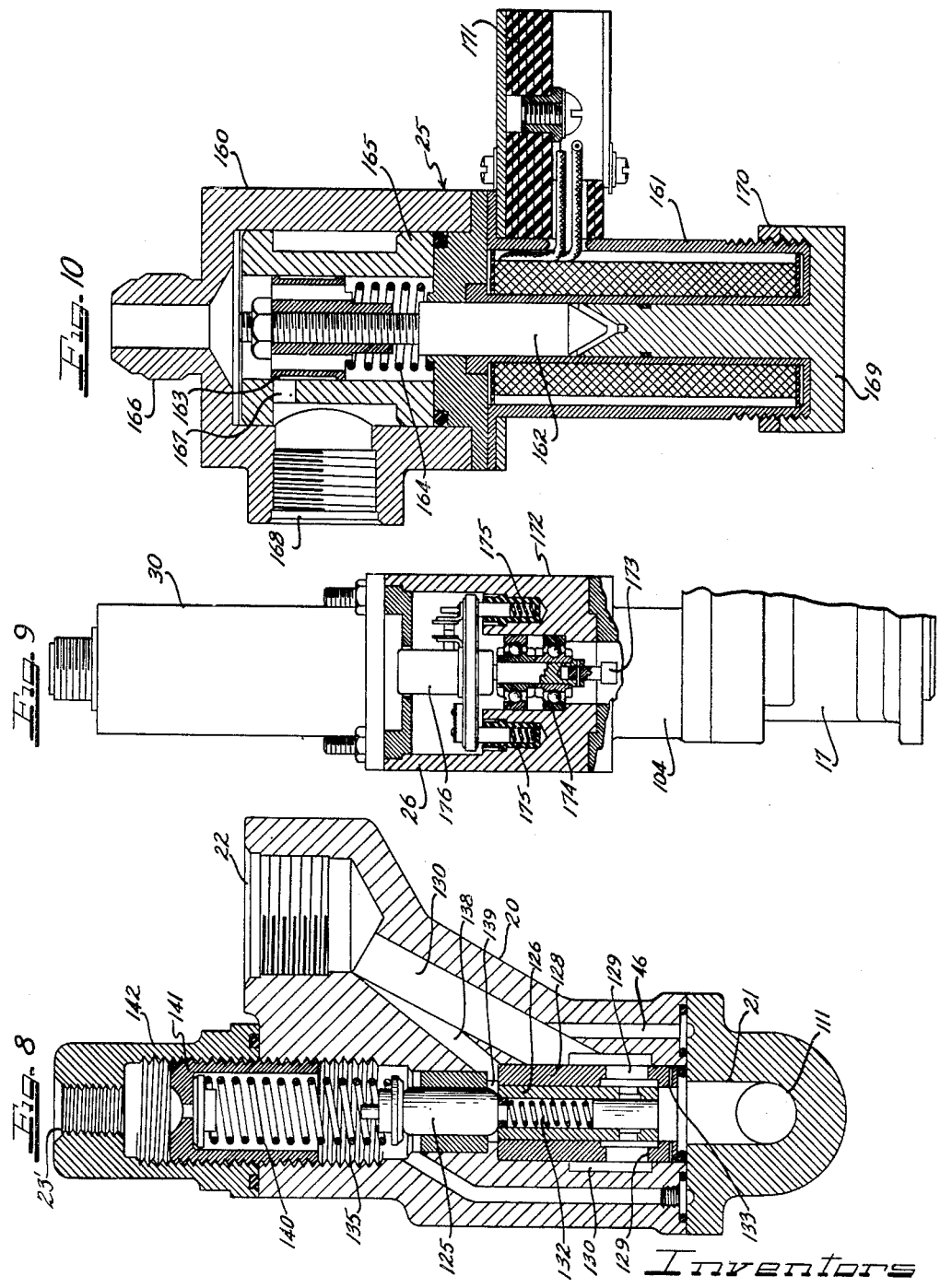

2,707,866

JET ENGINE FUEL CONTROL SYSTEM RESPONSIVE TO ENGINE SPEED AND TAIL PIPE TEMPERATURE

T Cyril Noon, Bainbridge Township, Geauga County, and Walter R. Chapman, Bedford, Ohio, assignors to Thompson Products, Inc., Cleveland, Ohio, a corporation of Ohio Application April 27, 1949, Serial No. 89,884

10 Claims. (Cl. 60—39.28)

The present invention relates generally to a fuel control unit to be used in conjunction with an electronic fluid control circuit of the type disclosed in the copending applications of Offner Serial Nos. 13,546, now Patent No. 2,573,596, and 770,872, now Patent No. 2,662,372.

The basic principle of a control system incorporating a fuel control device according to this invention is that it is, in general, a non-scheduling governor. By way of definitive explanation, it may be noted that with a full scheduling governor, engine speed is determined by a finite number of variables so that fuel flow, for example, may be scheduled against the variables to produce a desired speed value. A non-scheduling governor, as herein disclosed, exploits the concept of "derivative anticipation," which means that future values of speed and temperature are electronically determined by the preceding rate of change of such functions. It is isochronous during steady state running, and isothermal during accelerations. The electronic control is based on the use of a direct current signal voltage proportional to engine speed and a direct current signal voltage proportional to tailpipe temperature. The signals are amplified, various derivatives, integrals and related functions as required for stabilization and control are taken, and the resulting signal is sent to a proportional solenoid of a pilot valve in control of the fuel flow through a hydraulic servo-operated throttle valve.

If, under normal steady running conditions, a change in engine speed occurs, an increment in the governor generator signal voltage will be produced. The generator voltage is fed into a speed-determining circuit where the increment causes an unbalance in a speed circuit bridge. The bridge unbalance is then fed into an electronic selector which decides whether a speed control or a temperature control circuit will be used. For small speed changes, the speed selector places the speed circuit in control. The signal is then amplified by the D. C. voltage amplifier and, together with various derivatives and integrals required for stability, is fed into the proportional solenoid of the pilot valve. The proportional solenoid constitutes a solenoid type motor capable of delivering a linear motion proportional to its input voltage and as applied to the present invention it effects a deflection of a pilot valve piston through a distance proportional to the signal voltage and permits a high pressure to act selectively upon the top or the bottom of a balanced throttle valve metering piston whereby an engine speed correction will be produced. When the engine speed returns to normal, the speed bridge is balanced, the solenoid current has decreased to zero, the solenoid has returned to neutral, and the throttle valve piston will remain in a fixed position.

Should a speed change result in a tail-pipe temperature above that allowable for acceleration, the temperature bridge of the governor will become unbalanced in the direction which places the temperature circuit in control. The current flowing to the electronic selector will be amplified by the D. C. voltage amplifier, and by the same sequence as described above with respect to operation during a normal steady running, the fuel flow to the engine will be controlled so as to maintain the indicated tailpipe temperature in the engine.

It is an object of the present invention to provide a unitary light weight, compact fuel control unit containing all of the valves, governors and mechanically movable parts necessary to cooperate with an electronic fluid control circuit of the type disclosed in the copending applications of Offner Serial Nos. 13,546 and 770,872.

Another object of the present invention is to provide a fuel control unit utilizing a differentially compensating relief valve to give optimum pressure drop across a throttle valve.

Yet another object of the present invention is to provide an improved balanced throttle valve wherein flow through the valve is controlled by positioning a balanced floating piston.

The novel features which are believed to be characteristic of our invention are set forth with particularity in the appended claims. Our invention, however, both as to its organization and method of operation, together with further objects and advantages thereof, may be best understood by reference to the following description taken in connection with the accompanying drawings in which:

Figure 1 is a schematic diagram of a preferred fluid flow control system including the fuel system and the control thereof as energized by an electronic control;

Figure 2 is a view in elevation of the fuel control unit;

Figure 3 is a side elevation of the fuel control unit of Figure 2;

Figure 4 is a side elevation partly in section illustrating the engine drive connection of the unit and the pilot valve construction;

Figure 5 is a top plan view of the fuel control unit;

Figure 6 is a view in elevation, partly in section, of the fuel control unit taken along the line VI—VI of Figure 5, illustrating the relief valve and the throttle valve;

Figure 7 is a view in elevation partly in section of the fuel control unit taken along the line VII—VII of Figure 5 illustrating the proportional solenoid, the pilot valve, the throttle valve, and the operating solenoids;

Figure 8 is a vertical section taken along line VIII—VIII of Figure 5 illustrating the relief valve construction;

Figure 9 is a vertical sectional view of a modification of the fuel control unit illustrating the mounting for the centrifugal contactor control and the speed-sensitive unit for mounting on the fuel control unit assembly; and Figure 10 is a vertical sectional view of the assembly of the over-speed restriction valve.

As shown on the drawings:

For a detailed understanding of the electronic control circuit preferably utilized in conjunction with the fuel control unit of the present invention, reference should be made to the copending applications of Offner Serial Nos. 13,546 and 770,872.

Using the schematic diagram of Figure 1, the function of each component will be given in an operational sequence.

The fluid flow control system preferably comprises a jet engine 10 equipped with burners 11. The burners 11 are connected through suitable manifolding 12 to a flow divider 13.

Fuel is supplied from a tank 14 by a booster pump 15 to a fuel line 16 which is connected to the flow divider after being suitably operated upon by a fuel control unit 17 to which the fuel is delivered by a positive displacement pump 18 for delivering the fuel to the unit 17. The positive displacement fuel pump 18 is preferably of the gear type and delivers fuel from the tank 14 to a throttle valve 19 of unit 17 and to a relief valve 20 connected by the passage 21. A by-pass 22 connects the relief valve outlet back to the fuel supply line 16. The relief valve 20 is referenced to fuel nozzle pressure through the auxiliary hydraulic fluid line 23. The throttle valve 19 is actuated by servo-fluid from the pump 18. This servo-fluid is the fuel utilized in the system.

From the throttle valve 19, the fuel flows through a connection 24 to an over-speed restriction valve 25 controlled by an emergency over-speed centrifugal contactor 26 driven by the turbine (not shown) of the jet engine. The fuel then passes through a fuel line 27 to a hand shut-off valve 28 and thence to a fuel conduit 29 to the flow divider 13 where the fuel is distributed to the burners 11 through the manifolding 12.

The fuel control unit 17 also comprises a speed sensing unit 30 and a pilot valve 31 driven through suitable gearing 32 and 33 from a spur gear 34 connected to a spline shaft construction 35 which is operatively connected to the jet engine accessory drive.

The pilot valve 31 has a rotary sleeve 36 driven to decrease the friction no-break-away load in which is slidably mounted a piston 37 moved by a proportional solenoid 38. The proportional solenoid 38 constitutes a solenoid type motor capable of delivering a linear motion proportional to its input voltage.

A port 39 is connected through an auxiliary hydraulic line 40 to the throttle valve 19. A second port 41 is connected by an auxiliary hydraulic line 42 to the high pressure side of the pump 18, as illustrated. A third port 43 is connected with a conduit 44 to the throttle valve 19. A fourth port 45 of the pilot valve is connected through a low pressure conduit 46 to the by-pass line 22 connected to the low pressure side of the pump 18. The fourth port 45 is connected through a passage P with a space above the first port 39.

A pressure regulator 47 is connected to the high pressure line 42 through a conduit 48 and to the low pressure line 46 through a conduit 49. There is a fixed restriction 42' in the line between the throttle inlet and conduit 42.

The construction of the fuel control unit 17, which comprises the speed-sensing unit 30, the pilot valve 31, the throttle valve 19, the relief valve 20, and the pressure regulator 49 will be described in greater detail with reference to Figures 2 to 9, inclusive, wherein the fuel control unit is constructed as a unitary device to perform the functions illustrated diagrammatically in connection with Figure 1 and which will be described with respect to the operation of the fluid control system of our invention.

The throttle valve 19 is provided with a starting solenoid 50 and an idle speed solenoid 51. The solenoids 50 and 51 for the throttle valve 19 are to limit the movement of the valve upon starting and upon quick slow-up. Electrical circuits 52 and 53 connect these solenoids to the electronic control to be described later.

The over-speed restriction valve 25 is provided with a solenoid-operated valve 54, and the solenoid is operated through a D. C. circuit 55 (preferably 28 volts) of an over-speed control relay 56. The over-speed control relay 56 also comprises a series of contacts 57 in the circuits 55 and 58 in a circuit 59, which is in series with the circuit of the over-speed centrifugal contactor 26, and a manual re-set key 59' which may be connected to a suitable source of electrical energy, as a battery 60, and grounded at 61. The operation of the over-speed centrifugal contactor and over-speed control relay for the actuation of the over-speed restriction valve will be described in detail with respect to the operation of the fluid flow control system.

The governor for the fuel system is a box of electronic apparatus that can be located at any convenient place in the aircraft and receive its signals from a small D. C. generator 30 driven by the engine through the drives 32, 34 and 35, and also from a temperature-sensing unit 62 located in the tail-pipe 63 of the jet engine 10. Speed sense is obtained by comparing the output voltage of the D. C. generator 30 with a fixed D. C. voltage. The D. C. generator 30 is connected to the electronic apparatus through a circuit 64. The temperature-sensing unit 62 is connected to a temperature bridge 65 of the control apparatus through a circuit 66. A fixed D. C. voltage is supplied through a battery 67, a main switch 68 and its circuit 69. Speed sense is obtained by comparing the output voltage of the D. C. generator with a fixed D. C. voltage. A bridge comparison circuit 70 is used to eliminate the effect of the variation in the supply voltage. The speed bridge 70, together with the speed selector 71, is controlled by the speed controller 72 of the speed determining circuit 73. An electronic selector 74 comprising a cross-over bridge circuit 75 and a control system selector 76 is connected to the speed-determining circuit by connections 77 and 78 and the speed-sensing circuit through the connection 79.

An acceleration determining circuit 80 comprises an emergency acceleration bridge 81, an automatic relay switch 82, the temperature bridge 65, and a D. C. voltage amplifier 84. The emergency acceleration bridge circuit 81 is connected to the speed-sensing circuit 64 through the connection 85. The temperature bridge circuit is connected to the temperature-sensing unit 62 through the circuit 66. The control system selector 76 and the automatic switch relay 82 are connected through a circuit 86. The automatic switch relay 82 and the D. C. voltage amplifier are connected together through the circuit 87. A temperature over-ride voltage is sent back from the D. C. voltage amplifier 84 to the control system selector 76 through the circuit 88.

A D. C. amplifier (carrier type) circuit 89 is connected to the electronic selector through a circuit 90 and through the acceleration circuit 91. The output of the bridge is amplified in the electronic control biased as required by the temperature, speed or acceleration, and is used to control the proportional solenoid 38 through the amplified signal through the circuit 89'. The proportional solenoid positions the piston 37 in the pilot valve 31 which in turn hydraulically controls the position of the throttle valve 19.

In the above electronic control, the speed is sensed by the special tachometer 30. A derivative term is derived from this and combined with the speed term. Similarly, the temperature-sensing element 62, which may be a number of thermocouples in parallel, is used to generate the temperature signal. A temperature derivative signal is derived from this and combined with the temperature signal. The speed and temperature signals are then combined in the electronic selector 74 which chooses the signal required during the operation cycle. The resulting signal is amplified and applied to the proportional solenoid 38 which actuates the servo valve 37 to control the position of the valve piston 92 in the fuel flow control valve 19. In this system, the high pressure fuel is the working fluid for the servo system.

With the foregoing electronic control circuit, there are definite advantages. For example, complex computation circuits are easily made so that problems of multi-parameter control are readily solved. The use of the vacuum tube amplifier makes it possible to sense very small changes in engine speed or temperature, and a very sensitive control is therefore possible. An electronic control may be rather easily made insensitive to large changes in ambient temperature or pressure. Further, problems of hysteresis, friction and viscosity change are largely non-existant.

Electric circuits of the control respond almost instantly. The only mechanical portions are those for the throttle valve 19 and the pilot valve 37. Most of the time delays are removed from the system and a quickly responsive control results.

The electronic control has installation advantages since the electronic apparatus, the pilot control and the fuel control may each be placed in a most convenient location and connections made through electrical wires.

Having described the above with reference to Figure 1, our novel fuel system for a jet engine and the electronic control therefor, a preferred form of fuel control unit incorporating the speed-sensing unit, the pilot valve, the throttle valve, and a relief valve into a unitary structure in which the speed-sensing unit and the pilot valve are driven from the engine acceleration drive, will now be described.

Referring to Figures 2 to 5, inclusive, the arrangement of the parts comprising the fuel control unit will be described.

The fuel control unit 17 comprises a base housing 93 which is adapted for mounting on the housing of the turbo-jet engine in substantially a horizontal position when the engine is mounted in the airplane, and is adapted when in position as the spline 35 suitably meshes with accessory drive pad of the engine coupled to the shaft of the jet engine to be driven by the latter and in speed proportional to that of the engine. A cover plate 94 affixed to the base provides for the assembly and disassembly of a drive shaft 95 journaled in bearings 96 assembled in the base 93. The shaft 95 is connected to the spline 35 through a splined connection 97 and the spline is biased outwardly on the spline through a spring 98 providing a seal between the end of the gear 35 and the retaining washer 99. A pinion 100 drives spur gears 101 and 102, corresponding to the gears 34, 32 and spline 35 of Figure 1, driving the governor generator or speed-sensing unit 30 and the rotary sleeve 36 on the pilot valve 31. As shown in Figure 4, the base 93 is suitably ported for fuel seal drain connections. A pipe plug 103 (Figure 2) is provided for the drain connections.

An adaptor 104 is provided for mounting the governor generator 30 thereon and includes an attachable drive connection for the governor generator and also a drive connection for the over-speed centrifugal contactor 26 (Figure 9) when this over-speed centrifugal contactor is assembled on the adaptor 104 in conjunction with the governor generator. Accordingly, the arrangement, as illustrated in Figure 4, is used when the over-speed centrifugal contactor 26 is driven from the engine accessory drive, as shown schematically in Figure 1. In the assembly, as illustrated in Figure 9, the over-speed centrifugal contactor 26 and the speed-sensing unit are driven from the same connection to the engine acceleration drive.

The pilot valve 31 is also assembled upon the adaptor, as illustrated in Figures 2, 4 and 7.

A proportional solenoid construction 38 is affixed to the upper end of the pilot valve 31 and operatively connected thereto, as illustrated in Figure 7. The pressure regulator 47 is affixed to the pilot valve 31, as illustrated in Figures 2 and 7.

The throttle valve 19 is assembled to the pilot valve housing 31, as illustrated in Figures 2, 5, 6 and 7. Starting solenoid 50 and the idle speed solenoid 51 are mounted on the throttle valve 19, as illustrated in Figures 2 and 7.

Connectors 38', 50' and 51', respectively, are mounted on the proportional solenoid 38 and on the solenoids 50 and 51, as illustrated in Figure 2, for the connection of the electrical wiring of the electronic control circuit in the fuel control unit.

The pressure relief valve 20 is connected to the throttle valve 19, as illustrated in Figures 3, 6 and 7.

As is evident from the above disclosure, a very simple arrangement of a speed-sending unit, a pilot valve, a throttle valve, pressure regulator, and relief valve has been provided in a unitary fuel control unit of the fluid flow control system of this invention. It is also obvious that a unitary fuel control unit has been described in which the speed-sensing unit and the rotary valve 36 of the pilot valve 31 may be driven from a single drive connection operatively connected to the engine acceleration drive; and, as shown in Figure 9, a single unitary drive is provided in a fuel control unit for the over-speed centrifugal contactor, the speed-sensitive unit, and the pilot valve.

Referring to the drawings, a detailed description of each of the parts making up the unitary fuel control units will be described. The function of the throttle valve 19 is to meter the flow to the nozzles 11. It is composed of a free-floating hydraulically balanced piston 105 which passes over two equal metering orifices 106 and 107 in a throttle valve sleeve 108. In Figure 6 the fuel flows into an inlet 109 from the pump 18. (Figure 1) through a passage 11 and into the annular passage 110. From the annular passage 110 in the throttle valve body, the fuel flows through the metering ports 106 and 107 and thence out the outlet 112 through which is connected the conduit 24 leading to the over-speed restriction valve 25 (Figure 1).

Referring to Figure 6, the upper piston land 113 is provided with a groove 114 and a leakage path is formed by holes 115 to balance the pressure in the center zone between the upper piston land 113 and the lower piston land 116. The throttle housing 19 is provided with upper and lower closures 117 suitably affixed to the housing for assembling the piston 105 and the sleeve 108. Upper and lower adjusting stops 118 and 119 are provided for limiting piston 105 to a predetermined range of movement. The starting solenoid 50, which is a conventional solenoid design modified to push out when energized, is mounted as illustrated in Figures 3 and 7 and provides a throttle stop during starting to prevent over-travel of the throttle valve piston.

The idle solenoid 51 is a conventional pull-type solenoid and the function thereof is to form an idle fuel flow stop for the throttle valve piston during normal operation. In Figure 7, the idle solenoid is shown normally biased outwardly in the path of movement of the throttle valve piston 105. Referring to Figures 1 and 7, the throttle valve 19 is provided with passages 120 and 121 connected to chambers formed above and below the upper piston land 122 and lower piston land 116. These passages 120 and 121 correspond, respectively, to the auxiliary hydraulic line 40 and the conduits 44 connected to the ports 39 and 43 of the pilot valve (Figures 1 and 7).

The annular high pressure chamber 110 of the throttle valve is connected to a chamber 123 of the piston 37 by a passage corresponding to the passage 42, illustrated schematically in Figure 1.

In order to prevent a suction pull on the valve 105 by the local low static pressure produced by increased velocity flow of fuel through the port 106, the piston is relieved as at 115a.

Referring to Figures 6 and 8, the relief valve 20 will be particularly described. The relief valve 20 comprises a differential piston 125 and a metering piston 126. Sleeves 127 and 128 slidably mount the pistons, and the sleeve 128 is provided with ports 129 (Figure 8) connecting the annular chamber 130 with a low pressure return outlet 22 (Figure 1) through the passage 130. An emergency pressure relief 131, spring-biased by a spring 132, is operatively connected to the passage 111 through a passage 133 to the high pressure side of the pump 18. A passage 21 connects the passage 133 with the passage 111 (Figures 1 and 6). A passage 138 connects a chamber 139 above the piston 126 through the passage 138 connected to the low pressure return of line 22. A biasing spring 140 is adjusted by an adjusting nut 141 and locked in adjusted position by a lock nut 142 supplied with a suitable gasket for sealing the chamber 135.

The hydraulic auxiliary line 23 connects the chamber 135 by the opening 23' (Figures 6 and 8) to the conduit 29 between the flow divider 13 and the throttle 28.

The relief valve 22 described above, which is a differentially compensated type of relief valve, performs these functions: (1) regulates pump discharge pressures; (2) controls pressure drop across the throttle valve; (3) allows excess fuel to be returned to the pump inlet; (4) provides topping valve to prevent pump discharge pressure build-up beyond a safe limit; and (5) provides low pressure reference for fuel control servo-system. The relief valve is installed in parallel with the fuel pump 18. The compensation pressure line 23 is taken directly upstream from the flow divider 13.

Referring to Figures 6 and 8, fuel enters through the throttle valve inlet 109, passes into the lower section of the relief valve through the passages 21 and 133. Pressure is regulated by the combination of the large spring 140 through a large piston 126 and the upper piston 125 for normal operation. A mathematical equation for the relief valve is:

$$P_d A_d = P_c A_c + S_m$$

or $$P_d - P_c = \frac{S_m}{A_d} - P_c\left(1 - \frac{A_c}{A_d}\right) = \text{throttle valve pressure drop}$$

in which $P_d$ = pump discharge pressure
$P_c$ = compensation pressure
$S_m$ = main spring force
$A_d$ = area of large lower piston (metering piston)
$A_c$ = area of upper piston (differential piston)

In case of pressure build-up, the small lower piston 131 and spring 132 form a "topping" valve which prevents the fuel pump discharge pressure from becoming excessive.

Referring to Figures 1, 4 and 7, the pilot valve 31 and its associated proportional solenoid 38 will be described. The proportional solenoid 38 is provided with an armature 145 biased by springs 146 and 147 which operates the piston member 37 of the pilot valve 31. The rotary sleeve 36 contains a central high pressure fluid inlet to the chamber 123, and low pressure outlets 148 at each end lead to the pump by-pass 22 through the conduit 46. Outlets 149 lead to the opposite ends of the cylinder of the fuel control valve 19 through conduits 40 and 44. Piston 92 of the servomotor actuates a valve in the fuel injection line 24 leading to the engine to control the rate of fuel flow to the combustion chamber.

The proportional solenoid 38 produces translating movement of the armature 145 in one direction or the other from its neutral position fixed by the loading springs 146 and 147, dependent upon the sense of the current flow through the solenoid which in turn depends upon the polarity of the rectified output signal of the circuit 89'.

The piston 37 is directly connected to the proportional solenoid armature 145. The piston slides in the rotating sleeve 36 connected to the spur gear 101 (Figure 7) and the sleeve has ports connected as follows: The center port 152 is vented to the high pressure side of the throttle valve 19 through the high pressure conduit 42 to discharge into the annular chamber 110. The two inside ports 149 are vented to the top and bottom of the throttle valve through the connections 120 and 121 (Figure 7) and the corresponding connections 40 and 44.

The two outside ports 148 are vented to the low pressure through the connection 46 (Figure 1). As the pilot valve piston moves upward, high pressure fuel or fluid from the center port 152 is allowed to flow upward by the metering land and into the upper throttle valve chamber 153 through the passage 120 closing the throttle valve. Fuel in the lower throttle chamber 154 is vented to the lower pressure port 148. When the pilot valve piston 37 moves upward, the throttle valve 105 is opened.

The pressure regulator 47 (Figures 1 and 7) controls the high (servo) pressure in the pilot valve 31. It is a relief valve connected in parallel with the high and low pressure ports 152 and 148, respectively, through the conduits 48 and 49 (Figures 1 and 7) of the pilot valve 31. Its size is small, owing to a fixed orifice placed in the high pressure line, which limits the maximum fuel flow to the pressure regulator. Pressure regulator 47 comprises a piston 155 mounted in a ported sleeve 156 and biased by the spring 157. Pressure is adjusted by the threaded spring retainer 158 and locked in adjusted position by the adjusting lock 159 suitably sealed to prevent leakage of fluid from the pressure regulator 47.

The speed-sensing unit 30, which is normally a part of the fuel control unit 17, is operationally a part of the electronic control unit. This function is to sense engine speed and send a signal to the speed determining circuit proportional to the speed. It is essentially a D. C. voltage generator. Figure 4, for example, illustrates the speed-sensing unit mounted on the adaptor 104, while Figure 9 illustrates the speed-sensing unit and the over-speed centrifugal contactor 26 mounted together on the fuel control unit to make a more unitary fuel control unit.

The emergency over-speed protective system, referring to Figure 1, comprises the over-speed restriction valve 25, the over-speed centrifugal contactor 26, and the over-speed control relay 56. Referring to Figures 1 and 10, the over-speed restriction valve 25 comprises a sub-assembly body 160 to which is mounted a solenoid construction 161. The solenoid is provided with a plunger 162 on which is mounted a valve 163 spring-biased by a spring 164 and slidably mounted in a sleeve 165. The over-speed restriction valve is adapted to be connected by the conduit 24 to the connection 112 of the fuel control unit, although it is within the scope of the invention that it may be directly connected through a connection 166 permitting the fuel to enter the connection 166 controlled by the valve 163 and to discharge through an opening 167 to an outlet 168 connected through the conduit 27 (Figure 1) to the throttle construction 28.

The solenoid is provided with adjusting nut 169 and lock nut 170. The electrical connection to the overspeed control relay 56 and to ground, as illustrated in Figure 1, is made through the electrical connection 171 and the terminals thereof.

The over-speed restriction valve 25 is installed in the main fuel line (Figure 1), preferably downstream from the fuel control unit, although it is within the scope of the invention that it may be directly connected to the fuel control unit. These valves function to allow fuel to pass freely through to the nozzles 11 when energized open and to restrict the fuel to speed level idle when deenergized closed, spring-biased by the spring 169. The valve is solenoid-operated by the solenoid construction 161, using a balanced piston 163 to pass over the metering area 167 cut in the sleeve 165.

The over-speed centrifugal contactor 26 should be mounted on an engine drive pad, as illustrated schematically in Figure 1, or it may be directly mounted on the fuel control unit, as illustrated in Figure 9, and is rotated in proportion to engine speed. The over-speed centrifugal contactor comprises a body 172 which is adapted to be connected directly to an engine pad or to the adaptor 104 (Figure 9). A drive shaft 173 is suitably mounted in bearings 174 and is adapted for connection either to the engine acceleration drive or to the drive of the adaptor 104. Brush constructions 175 are mounted in the body 172 for electrical connection to the motor speed centrifugal contactor construction 176. The centrifugal contactor 26 functions to break the power circuit to the restriction valve solenoid 161 when engine speed reaches a given predetermined value.

The over-speed control relay, illustrated schematically in Figure 1, is to keep the power circuit through the restriction valve solenoid 161 disconnected after the centrifugal contactor points come together again when the engine speed decreases. The system is reset by closing the manual reset switch 59 after engine idle speed is reached.

The electronic control unit which has been illustrated and described with reference to Figure 1, illustrating schematically the electronic control circuit including the speed determining and acceleration determining circuits of the turbo-jet engine control system, comprises the speed controller 72, an electronic control box, an emergency switch box (not shown), and the temperature-sensing unit 62. The speed controller 72, which is mechanically linked to the pilot's hand throttle lever of the shut-off cock 28 and electrically connected to the electronic control, serves to perform the following functions:

(1) Controls the energizing and de-energizing of the starting and idle throttle valve solenoids, respectively 50 and 51, through the control circuits 52 and 53;

(2) Acts as the variable arm of the speed bridge, and the engine speed is set by the position of this arm; and (3) Includes a vernier adjustment for setting full speed.

The electronic control box which contains the electronic control, which is energized by the airplane batteries 67, receives a signal from the temperature-sensing unit 62 and from the speed-sensing unit 30 and sends a corrective output signal voltage to the proportional solenoid 38. Referring to Figure 1, the electronic control box comprises a speed-determining circuit 73, an electronic selector 74, an acceleration-determining circuit 80, and a D. C. amplifier (carrier type) 89.

The speed-determining circuit 73 receives a speed signal from the speed-controller 72 (desired speed) and speed signal from speed-sensing unit 30 (existing speed). It measures the difference in the speed-sensing signal form desired by means of a bridge circuit 70. The speed determining circuit functions also to feed off-speed voltage to an electronic selector cross-over bridge 75 to provide basis of selection for the circuit to be placed in control. It also functions to feed control current to the proportional solenoid 38 via the electronic selector 74 and D. C. amplifier 89 when the electronic selector 74 places the temperature or speed-determining circuit in control.

Electronic selector 74 selects one of the two following circuits for control: acceleration-determining circuit (temperature control) 80, and speed-determining circuit 73.

Acceleration-determining circuit 80 functions when placed in control to measure off-temperature from desired temperature by means of the temperature bridge 65. It also feeds off-temperature signal to the proportional solenoid 38 through the electronic selector 74 and D. C. amplifier 89.

The D. C. amplifier 89 functions to provide sufficient power to operate proportional solenoid 38. It is of a special stable type, requiring no balancing.

The electronic control unit comprising the various elements disclosed above with reference to Figure 1 has only been disclosed for a better understanding of our invention in a fluid flow control system comprising the novel fuel system in combination with an electronic control system for the controlling of a turbo-jet engine, and the electronic control system has been disclosed in connection with the fuel system as an example of a full-floating governor employing derivative anticipation wherein future values of both speed and temperature are electronically determined by the preceding rates of change of these functions.

The basic principle of the control system of this invention is that it is in general a non-scheduling governor. It is isochronous during steady state running, and isothermal during accelerations. The electronic control is based on the use of a direct current signal voltage proportional to engine speed and a direct current signal voltage proportional to tail-pipe temperature. These signals are amplified, various derivatives, integrals and related functions as required for stabilization and control are taken, and the resulting signal is sent to a proportional solenoid 38 which controls the fuel flow through a hydraulic servo-operated throttle valve 19.

Referring to Figure 1, which shows the functional relationship of each of the components, the function of each component will be given in an operational sequence.

Operation during normal steady running will now be described. A change in engine speed from normal stabilized operation results in an increment in governor generator 30 signal voltage. The generator voltage is fed into the speed-determining circuit 73 where the increment causes an unbalance in the speed circuit bridge 70. The bridge unbalance is fed into the electronic selector 74 which decides whether the speed control or temperature control circuit will be used. For small speed changes, the speed selector 71 places the speed circuit 73 in control. The signal is then amplified by the D. C. voltage amplifier 89 and, together with various derivatives and integrals as required for stability, is fed into the proportional solenoid 38. The proportional solenoid deflects the pilot valve piston 37 at a distance proportional to the signal voltage and allows high (servo) pressure to be vented either to the top or to the bottom of throttle valve 19, the metering piston 92 resulting in an engine speed correction. When the engine speed returns to normal, the speed bridge is balanced, the solenoid current has decreased to zero, the solenoid has returned to neutral, and the throttle valve piston 92 remains in position.

Should a speed change result in a tail-pipe temperature above that allowable for acceleration (approximately 1500° F.), the temperature bridge 83 becomes unbalanced in the direction which places the temperature circuit in control. The operation during normal acceleration will now be described. For a required change in engine speed from normal stabilized operation, the speed selector 71 is manually displaced by the hand lever 72 resulting in a signal to the electronic selector 74 which places the acceleration-determining circuit 80 in control. The speed control 72 is operatively connected to the pilot hand lever 177 of the throttle valve 28. The temperature bridge 83 of the acceleration-determining circuit 80 is unbalanced for any temperature unit 62 voltage signal corresponding to indicated tail-pipe temperatures under 1500° F. (The datum temperature for acceleration.) Thus, the current flowing to the electronic selector 74 is amplified by the D. C. voltage amplifier 89 and, by the same sequence as described above with respect to operation during normal steady running, changes the fuel flow to the engine, maintaining the indicated tail-pipe temperature at 1500° F. When a pre-set per cent of change in desired engine speed has been reached, the cross-over bridge 75 places the speed-determining circuit 73 in control. From this point, the governor operates as described in steady state operation.

The operation of the emergency acceleration circuit will now be described when used with the resistance thermometer. Should the temperature unit 62 become defective during acceleration, the acceleration-determining circuit 80 and emergency acceleration bridge 81 are placed in control by automatic switch 82. The emergency acceleration bridge 81 limits the acceleration to a predetermined value which does not produce excessive tail-pipe temperatures. It operates through the D. C. voltage amplifier 89 and hydraulic servo system as previously described above. The cross-over bridge 75 functions as described above with respect to the operation during normal acceleration to select the speed-determining circuit 73 upon reaching a preset fraction of desired engine speed change.

The operation of the emergency over-speed protective system will now be described. During normal operation, the solenoid-operated over-speed restriction valve 25 is energized open and allows fuel to flow to the nozzles 11. The power circuit to the solenoid 54 contains a centrifugal contactor 26 which is rotated by the engine. It is adjusted to have the contacts break at a given engine speed and thus deenergize the solenoid and allow the spring to close the valve when engine speed is excessive. The valve closes to a position which allows the engine to idle at sea level. In order to reset the system so that fuel may flow to the nozzles through the primary system, the pilot's hand lever 177 (mechanically linked to the speed controller 72) must be retarded to the idle position and the manual reset switch 59 tripped.

The automatic starting of the jet engine will now be described. Starting with the governor circuit main switch 68 in the "On" position, the ignition and starter (not shown) are energized. Upon reaching 400 to 600 R. P. M. engine speed, the pilot's hand lever 177 is advanced to its "Start" position. The electronic control regulates the temperature and speed in a manner similar to that described for normal acceleration; that is, the electronic selector places the acceleration-determining circuit in control and the engine is allowed to accelerate on temperature control up to the cross-over point, at which time the speed-determining circuit 73 is placed in control. Alternatively, the governor may be made to accelerate to idle speed on temperature control, assuring a minimum time for acceleration from zero to idle speed. The ignition and starter switch (not shown) is returned to "Off" position when the engine reaches approximately 1500 R. P. M.

When the engine speed reaches 1800 to 2000 R. P. M. the pilot's hand throttle is advanced to "Idle." Shifting the hand throttle 177 from "Start" to "Idle" accomplishes these functions:

(*a*) The start solenoid 50, which was energized out to limit the open travel of the throttle valve piston 92 during start, is deenergized and remains clear from the path of the throttle valve piston 92 for normal operation.

(*b*) The idle solenoid 51, which was energized in to allow the throttle valve to move freely from closed to the start solenoid stop, is deenergized and remains a lower stop for the throttle valve piston travel 92.

(*c*) The modified hand throttle 28 is advanced to a relatively low pressure drop metering area, allowing design pressure drop to exist across the throttle valve 19 and place the electronic control at normal operating conditions. Movement of the throttle valve 28 is operatively connected to the speed controller 72 by a suitable connection previously described above. The operation of the electronic control at normal operating conditions was previously described above with respect to operations during normal steady running.

(*d*) The starting temperature datum is shifted from starting to normal acceleration temperature datum. Having reached "Idle" hand lever setting, the engine may be accelerated to any operation speed.

With the fluid flow control system of this invention, the system is also adapted for manual starting. Manual starts may be accomplished in the usual manner for turbo-jet engines, exercising care to avoid advancing the pilot's hand throttle 177 beyond "Start" position. The governor is energized as for an automatic start as disclosed above. Advancing the throttle up to "Idle" and beyond is as indicated in the description with respect to automatic starts.

It is therefore evidenced that we have disclosed a fluid flow control system for a turbo-jet engine which has excellent performance characteristics. In this system, it is possible to maintain within very close limits any selected speeds between idle and top speed. It is also possible to accelerate the engine from any speed without exceeding a tail-pipe temperature limit of 1500° F. except for a permissible transient at the start of each acceleration. While it is not permissible to exceed the temperature limit, neither is it desirable to accelerate at a lower temperature, since this makes the engine acceleration time undesirably long.

With this control system, with the engine running at a steady state, it is possible to govern the speed within approximately one-tenth of one per cent. The dead band of the governor is less than this value, and as nearly as can be measured under operating conditions, the speed of the engine returns to identical values after having been disturbed from the governed speed.

With respect to the temperature and speed characteristics of the control system, the temperature goes quickly to the desired indicated 1500° F. datum and maintains this value within a small percentage of the selected speed.

A fluid flow control system has also been described including a quickly responsive governor for operating under such conditions as carrier wave-off. For example, with this control system, if the throttle lever is suddenly advanced after having been pulled all the way back, and the engine is decelerating at its maximum rate, the fuel flow will increase to the maximum allowable value with a minimum of relay.

It is also evident, in addition to the basic requirements of a jet engine power control of reliability, ruggedness and stability, there has also been disclosed a power control which satisfies the requirement from the pilot's standpoint of simplicity of handling. From the pilot's standpoint, there should be only one control or throttle lever. It is also obvious that a power control apparatus has been disclosed which performs certain automatic functions to protect the engine against mishandling of the throttle and to maintain constant engine speed for selected throttle setting.

It is also apparent that in the fluid flow system of this invention by means of electronics, a truly isochronous control is possible so that any selected engine speed is held automatically within one-half per cent, accelerations are controlled on the basis of tail-pipe temperature, and only one throttle or control lever is required, and response to its movement is rapid but automatically held within the limits of safe engine operation.

While we have resorted to detail in the description of our invention for the sake of clarity, it will, of course, be understood that many modifications with respect to various details will suggest themselves to those versed in the art which will not mark a departure from the true spirit of our invention. We desire to be limited, therefore, only by the scope of the appended claims and the prior art.

We claim as our invention:

1. A fluid flow control system adapted to supply desired amounts of fuel to the burner nozzles of a jet-type engine under full control of the pilot which comprises a positive displacement pump, a throttle valve, a relief valve equipped for bypass from said throttle valve to the suction side of the pump, means for referencing the relief valve to fuel pressure in the burner nozzles, fuel-actuated means driving said throttle valve, an engine-driven over-speed centrifugal contactor, and a restriction valve controlled by said contactor receiving fuel from the throttle valve and feeding fuel to the burner nozzles.

2. In a fuel system for a jet engine of the type having a tail pipe temperature sensing unit and an engine speed sensing unit to generate temperature and speed signals, the improvement of means supplying a quantity of pressurized fluid fuel, a throttle valve to meter said fluid to the engine, a servo mechanism in control of said throttle valve, and a motor being responsive to said speed and temperature signals to actuate said servo mechanism.

3. In a fuel system as defined in claim 2, said servo mechanism more particularly comprising a pilot valve operatively connected to said throttle valve, said motor more particularly comprising a single-responsive motor, thereby to condition said throttle valve for future engine requirements as a function of the preceding rate of change of speed and temperature.

4. In a fuel system as defined in claim 2, said sensing units generating signal voltages and said motor being an electric signal-responsive motor, thereby to condition said throttle valve electrically for future engine requirements as a function of the preceding rate of change of speed and temperature.

5. In a fuel system for a turbo-jet engine of the type including a plurality of nozzles and an electronic governor including a speed-sensing unit connected to the turbo-jet engine and a tail-pipe temperature-sensing unit connected to the exhaust tail-pipe of the engine, the improvement of pressurizing means in communication with a fuel supply, a throttle valve to regulate the discharge from said pressurizing means to the engine, a pilot valve in control of said throttle valve, and signal responsive motor means to regulate said pilot valve in response to temperature and speed signals from the electronic governor.

6. A fluid flow control system for a jet-type engine of the type having a speed-sensing unit generating a signal substantially proportional to engine speed and a temperature-sensing unit adapted to generate a signal substantially proportional to tail-pipe temperature, the improvement of a fuel control unit comprising a pilot valve having a linearly movable control member regulating the selective flow of a working fluid, a proportional solenoid connected to said control member and adapted to actuate said control member in response to the temperature and speed signals from the engine, and a throttle valve controlled by said pilot valve including a cylinder having pressure chambers in opposite ends thereof and selectively receiving said working fluid from said pilot valve, a piston having reactive face portions in each of said pressure chambers and being floated in said cylinder by the pressures in said chambers, and means providing fuel flow passages controlled by said piston to regulate the flow of fuel to the engine.

7. The combination with a turbo-jet engine including a plurality of nozzles, of a fluid flow control system for delivering fuel to the nozzles under pressure comprising, a fuel tank, pumping means communicating therewith, a relief valve for controlling the pressure of the pumping means, a pilot valve having a linearly movable control member regulating the selective flow of a working fluid, a proportional solenoid connected to said control member and adapted to actuate said control member in response to signals proportional to temperature and speed from the engine, a throttle valve controlled by said pilot valve including a cylinder having pressure chambers in opposite ends thereof and selectively receiving said working fluid, a piston having reactive face portions in each of said pressure chambers and being floated in said cylinder by the pressures in said chambers, means providing fuel flow passages controlled by said piston to regulate the flow of fuel to the engine, an overspeed restriction valve downstream from the throttle valve and in said fuel flow passages, means to actuate said overspeed restriction valve in response to a predetermined speed of the engine and a manual throttle valve ahead of the nozzles for effecting manual control of the engine speed.

8. The combination with a turbo-jet engine including a plurality of nozzles, of a fuel flow control system comprising a fixed displacement fuel pump, a pressure relief valve for controlling the outlet pressure of the fixed displacement fuel pump, a pilot valve having a linearly movable control member regulating the selective flow of a working fluid, a proportional solenoid connected to said control member and adapted to actuate said control member and a throttle valve controlled by said pilot valve including a cylinder having pressure chambers in opposite ends thereof receiving said working fluid, a piston having reactive face portions in each of said pressure chambers and being floated in said cylinder by the pressures in said chambers, means providing fuel flow passages from said pump and controlled by said piston to regulate the flow of fuel to the engine, the high pressure fuel from the fuel system being the working fluid for the pilot valve, and means responsive to the temperature of the jet engine and the speed thereof connected to said proportional solenoid, thereby to control the supply of fuel to the engine.

9. In a fuel system for a jet engine of the type including a plurality of nozzles and including an electronic governor responsive to the temperature and the speed of the engine, a fuel pump, a relief valve adapted to control the fuel pump discharge pressure, a pilot valve having a linearly movable control member regulating the selective flow of a working fluid, a throttle valve controlled by said pilot valve including a cylinder having pressure chambers in opposite ends thereof and receiving said working fluid from said pilot valve, a piston having reactive face portions in each of said pressure chambers and being floated in said cylinder by the pressures in said chambers, means providing fuel flow passages from said fuel pump and controlled by said piston to regulate the flow of fuel to the engine, a proportional solenoid connected to said control member of said pilot valve and, in turn, controlled by the electronic governor for actuating the pilot valve in response to the temperature and speed of the engine, a starting solenoid means and an idle solenoid means connected to said throttle valve for controlling the floating piston at starting and at idle operation, whereby the flow of fuel to said engine will be controlled.

10. A fuel control unit for a fluid flow control system adapted to govern a jet-type engine of the type including a temperature sensing unit and a speed sensing unit, comprising, a pilot valve having a linearly movable control member regulating the selective flow of a working fluid, a proportional solenoid connected to said control member and adapted to actuate said control member in response to the temperature and speed signals from the engine, and a throttle valve controlled by said pilot valve including a cylinder having pressure chambers in opposite ends thereof, a piston having reactive face portions in each of said pressure chambers and being floated in said cylinder by pressures communicated to said chambers by said pilot valve, means providing fuel flow passages controlled by said piston to regulate the flow of fuel to the engine, means for limiting the movement of the floating piston during the starting period of the engine, means for limiting the motion of the piston during the idle period of the engine, a pressure relief valve for controlling the pressure drop across the throttle valve, said pilot valve including a rotary sleeve surrounding said control member to minimize frictional interference, and drive means for rotating said rotary sleeve of said pilot valve.

References Cited in the file of this patent

UNITED STATES PATENTS

| | | |
|---|---|---|
| 1,643,435 | Allardice | Sept. 27, 1927 |
| 2,077,192 | Warner | Apr. 13, 1937 |
| 2,219,994 | Jung | Oct. 29, 1940 |
| 2,297,399 | Fuscaldo | Sept. 29, 1942 |
| 2,320,008 | Price | May 25, 1943 |
| 2,359,017 | Balsiger | Sept. 26, 1944 |
| 2,391,531 | Warren | Dec. 25, 1945 |
| 2,410,774 | Chandler | Nov. 5, 1946 |
| 2,457,595 | Orr | Dec. 28, 1948 |
| 2,528,252 | Starkey | Oct. 31, 1950 |
| 2,545,856 | Orr | Mar. 20, 1951 |
| 2,564,107 | Holley | Aug. 14, 1951 |
| 2,581,276 | Mock | Jan. 1, 1952 |

FOREIGN PATENTS

| | | |
|---|---|---|
| 926,065 | France | Sept. 22, 1947 |
| 577,014 | Great Britain | May 1, 1946 |